(12) United States Patent
Bernardo et al.

(10) Patent No.: US 12,704,862 B2
(45) Date of Patent: Aug. 11, 2026

(54) OVERPRESSURE COMPENSATION SYSTEMS AND ASSEMBLIES FOR A SUBSEA MANIFOLD

(71) Applicant: FMC Technologies, Inc., Houston, TX (US)

(72) Inventors: Leonardo de Araujo Bernardo, Dunfermline (GB); Guilherme Sousa Moura, Rio de Janeiro (BR); Huei Lai, Linlithgow (GB); Andre Faisca, Rio de Janeiro (BR); Gustavo Antonio Vieira Borges, Rio de Janeiro (BR)

(73) Assignee: FMC Technologies, Inc., Houston, TX (US)

( * ) Notice: Subject to any disclaimer, the term of this patent is extended or adjusted under 35 U.S.C. 154(b) by 52 days.

(21) Appl. No.: 18/514,309

(22) Filed: Nov. 20, 2023

(65) Prior Publication Data

US 2025/0165016 A1 May 22, 2025

(51) Int. Cl.
*G05D 16/10* (2006.01)
*E21B 43/017* (2006.01)
*F15B 1/24* (2006.01)

(52) U.S. Cl.
CPC .......... *G05D 16/10* (2013.01); *E21B 43/0175* (2020.05); *F15B 1/24* (2013.01); *F15B 2201/31* (2013.01)

(58) Field of Classification Search
CPC .......... F15B 1/025; F15B 1/24; F15B 21/006; F15B 2201/21; F15B 2201/31
See application file for complete search history.

(56) References Cited

U.S. PATENT DOCUMENTS 3,672,402 A * 6/1972 Bloemer ................. F16L 55/05 91/417 R
3,677,001 A 7/1972 Childers et al.
3,906,839 A * 9/1975 Schexnayder .......... E02F 3/655 91/418
9,200,496 B2 12/2015 Reid
2004/0238054 A1* 12/2004 Weber ....................... F15B 1/24 138/31
2010/0206389 A1* 8/2010 Kennedy ................... F15B 1/24 137/511
2012/0168173 A1 7/2012 Urquhart et al.
2013/0333894 A1 12/2013 Geiger et al.
2014/0130924 A1* 5/2014 Basin ........................ B60T 8/00 138/31

OTHER PUBLICATIONS

PCT Patent Application PCT/US24/43810 International Search Report and Written Opinion of the International Searching Authority issued Nov. 14, 2024.

* cited by examiner

*Primary Examiner* — Robert K Arundale
(74) *Attorney, Agent, or Firm* — Erise IP, P.A.

(57) ABSTRACT

Systems, methods, and devices for compensating overpressure associated with thermal expansion of fluid within a closed cavity of a subsea manifold assembly. At least one piston assembly may be included and selectively fluidly connected to the closed cavity to counteract or reduce a pressure produced within the closed cavity.

20 Claims, 8 Drawing Sheets

OVERPRESSURE COMPENSATION SYSTEMS AND ASSEMBLIES FOR A SUBSEA MANIFOLD

BACKGROUND

1. Field

Embodiments of the present disclosure relate to manifold assemblies. More specifically, embodiments of the present disclosure relate to overpressure compensation mechanisms for a subsea manifold.

2. Related Art

Block manifolds may be used in subsea systems in place of pipe manifolds. such as, for example, subsea systems configured for gas and oil collection or other subsea operations. However, block manifolds are more rigid and, therefore, not as well suited for thermal expansion of fluid disposed therein. Accordingly, high pressures associated with thermal expansion of fluid within the block manifold may rise above a pressure rating of sensitive components within the manifold, such as valves, sensors, pumps, caps, and other devices. For example, in some cases, a cavity associated with the manifold may be capped off such that a pressure inside of the cavity builds up and cannot be released. An overpressure associated with the cavity may result in premature failure and wear of valves, pumps, caps, and other sensitive components of the manifold system.

SUMMARY

Embodiments of the present disclosure may solve the above-mentioned problems by providing systems, methods, and devices for relieving an overpressure associated with a closed volume of a subsea manifold using an overpressure compensation assembly coupled to the subsea manifold.

In some aspects, the techniques described herein relate to an overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly including: a piston assembly including: a piston; a first end coupled to the closed cavity of the subsea manifold to compensate a pressure within the closed cavity; and a second end disposed opposite the first end, the second end configured to allow expansion of fluid within the closed cavity.

In some aspects, the techniques described herein relate to an overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly including: a piston assembly including: a piston; a first end coupled to the closed cavity of the subsea manifold to compensate a pressure within the closed cavity; and a second end coupled to a spring.

In some aspects, the techniques described herein relate to an overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly including: a first piston assembly including: a piston; a first end coupled to the closed cavity of the subsea manifold to compensate a pressure within the closed cavity; and a second end including a barrier fluid disposed therein, the barrier fluid distinct from the fluid within the closed cavity.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
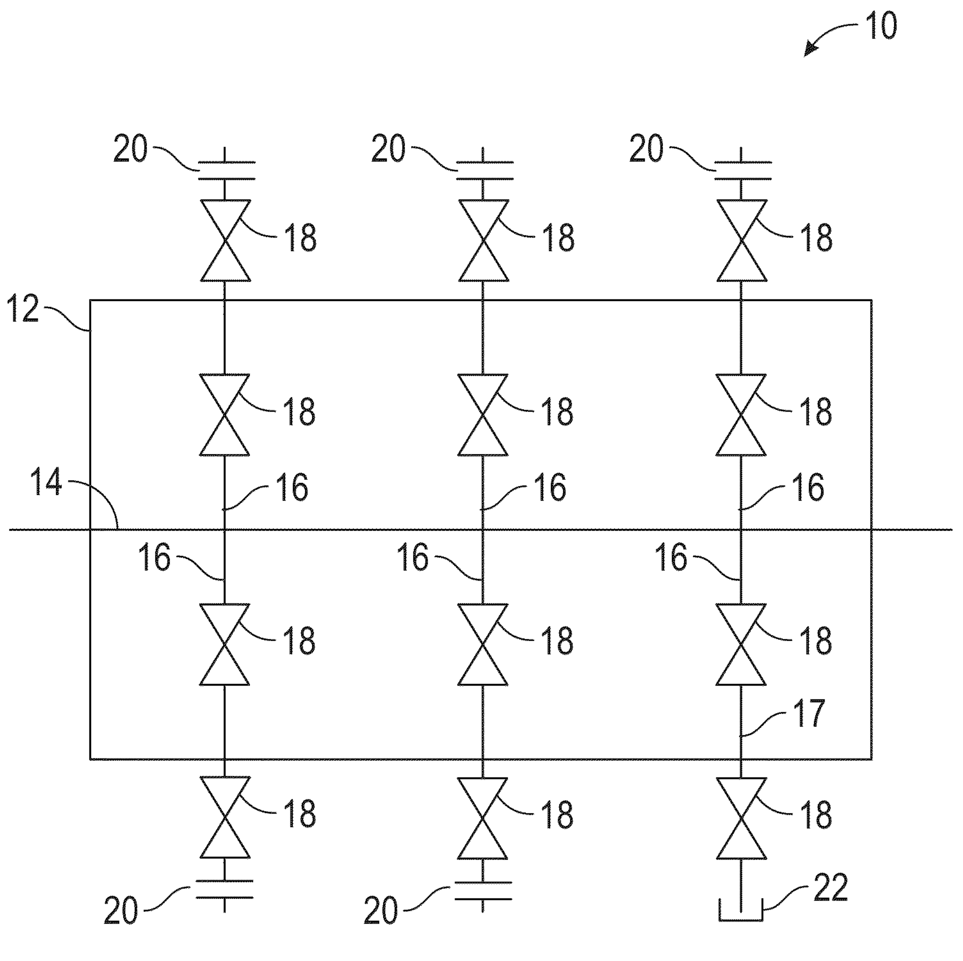
FIG. 1 illustrates an exemplary diagram of a subsea manifold system in accordance with embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure relate to a manifold system, an overpressure system, and a piston assembly for countering an overpressure associated with a subsea manifold system. Subsea manifold systems may include a block or pipe manifold including at least one header bore fluidly connected to a plurality of branch connections. In some cases, one or more of the branch connections may be closed off at least temporarily. For example, a branch connection may be capped off while not in use, creating a trapped volume within a cavity of the branch connection. Heat produced by one or more active branch connections, or within the header bore, may be transferred to the trapped volume, resulting in thermal expansion within the cavity. The thermal expansion causes the pressure within the cavity to increase and may result in overpressure that exceeds a pressure rating of one or more components associated with the respective branch connection. In some cases, pressure changes attributed to thermal expansion range from about 5 kilo-pounds per square inch to about 15 kilo-pounds per square inch. Accordingly, embodiments of the present disclosure seek to provide a mechanism and/or device for relieving the pressure within the cavity.

Overpressure within a closed cavity is especially relevant for block manifolds because of the limited thermal expansion associated with the rigidity of the block manifold. However, it should be understood that a similar problem may be present in pipe manifolds. Accordingly, embodiments of the present disclosure are contemplated for any form of manifold system.

FIG. 1 illustrates an exemplary diagram of a subsea manifold system 10 relating to some embodiments of the present disclosure. For example, the subsea manifold system 10 may be used for subsea drilling operations, such as subsea oil production and other marine and offshore operations.

The subsea manifold system 10 includes a block manifold 12, as shown. The block manifold 12 may include a header bore 14 including a bore extending at least a portion of a length of the block manifold 12. In some embodiments, the header bore 14 is fluidly connected to a plurality of branch connections 16. The branch connections 16 may be connected perpendicular to the length of the header bore 14, as shown. The branch connections 16 may be coupled to a 'Christmas tree' assembly including a plurality of subsea piping and tubing structures. Further, in some embodiments, the branch connections 16 may be associated with one or more crossover conduits of the subsea manifold system 10 that are fluidly connected substantially perpendicularly to the header bore 14.

In some embodiments, a fluid connection between the header bore 14 and the plurality of branch connections 16 may be selectively opened, closed, and/or throttled using a respective valve 18 of a plurality of valves included in the manifold system 10. Each valve 18 may include a gate valve or another suitable valve configured to selectively block the flow of fluid within the respective branch connection 16. In some embodiments, at least one of the plurality of valves 18 includes a bidirectional gate valve configured to block flow in both directions, i.e., from the branch connection 16 to the manifold header bore 14 and vice versa. In some embodiments, at least one respective valve 18 of the plurality of valves includes a dual gate valve including a pair of closable gates (or disks) configured to selectively block flow through the respective tree connection. Further, in some embodiments, multiple gate valves may be included at each branch connection 16. For example, a first gate valve may be disposed at the connection with the block manifold 12 while a second gate valve is disposed at an opposite end of the crossover conduit.

The subsea manifold system 10, as shown, includes six branch connections 16. However, it should be understood that embodiments are contemplated with any number of branch connections 16, such as, for example, a single branch connection, two branch connections, four branch connections, or a greater number of branch connections. Further, in some embodiments, the branch connections 16 may be arranged perpendicularly to the header bore 14, as shown. However, embodiments are contemplated in which one or more of the branch connections 16 are arranged and connected to the block manifold 12 at a different angle relative to the header bore 14. For example, in some embodiments, the branch connections 16 are attached at a 30-degree angle, a 45-degree angle, or another suitable angle to the length of the header bore 14. Further still, in some embodiments, at least one of the branch connections 16 is aligned or substantially aligned with the flow through the header bore 14.

In some embodiments, at least a portion of the plurality of branch connections 16 are coupled to a production line 20 by which a production fluid or other fluid travels into the header bore 14. Alternatively, or additionally, one or more of the branch connections 16 may be capped off using at least one cap 22, as shown. The cap 22 may be disposed on an end of a respective branch connection 16 to disengage the respective branch connection 16. In some embodiments, one or more of the branch connections 16 may be disconnected or closed at least temporarily using any combination of the cap 22 or the valves 18. For example, flow from a particular branch connection 16 may be closed to perform maintenance operations or while the branch connection is not productive. Further, in some embodiments, a larger number of branch connections 16 may be included than lines that are actually producing. Accordingly, it may be desirable to shut off flow at one or more redundant branch connections while not in use.

In some embodiments, the cap 22 may include a metal-to-metal contact interface with a crushed gasket to provide a pressure seal within the closed cavity of the respective branch connection 16. Alternatively, in some embodiments, the cap 22 may include an elastomeric cap or a temporary short-term cap, such as a temporary cap used to perform maintenance routines or repairs on the subsea manifold system 10. Further still, in some embodiments, multiple caps 22 may be included on a single branch connection 16 or a combination of caps and external valves to provide redundancy to ensure the closed cavity remains closed. For example, in some embodiments, an external valve is disposed on an end of at least one branch connection to selectively close a cavity of the at least one branch connection.

Alternatively, or additionally, in some embodiments, a pair of valves 18 is included at each branch connection 16, as shown. Accordingly, a trapped volume 17 may be generated within a closed cavity of the respective branch connection 16 when the pair of valves 18 is closed. The trapped volume 17 of fluid within the closed cavity may experience thermal expansion due to high-temperature fluid flowing through another portion of the manifold system 10, such as another one of the branch connections 16 or the header bore 14. In some such embodiments, the cap 22 may not be included and/or may be replaced with a second valve 18. Further, in some embodiments, the additional valve 18 and the cap 22 are included to provide redundancy and prevent leakage. Further still, in some embodiments, multiple separate trapped volumes may be generated within a single branch connection 16. Similarly, multiple trapped volumes may be generated when multiple branch connections 16 are closed (i.e., both of the valves 18 are closed).

In some embodiments, flow through the branch connections 16 may be optionally shut off using the one or more valves 18 disposed at each interface of the branch connection 16 with the header bore 14. In some such embodiments, the valves 18 may include gate valves configured to seal and block flow in at least one direction through the branch connection 16. For example, in some embodiments, at least one of the valves includes a bidirectional gate valve configured to prevent fluid flow and provide a pressure seal to prevent fluid from traveling from the header bore 14 to the branch connection 16, as well as from the branch connection 16 to the header bore 14. In some embodiments, the fluid described herein may include any suitable fluid, such as, for example, a production fluid, water, cleaning or maintenance fluid, an unknown fluid, or another incompressible fluid not explicitly described herein.

In some embodiments, the subsea manifold system 10 includes any of a number of additional components such as for example, pumps, redundant valves, redundant caps, additional fluid connections, pumps, as well as other manifold components not explicitly described herein. In some embodiments, one or more temperature sensors may be disposed within the subsea manifold system 10 configured to detect a temperature associated with the block manifold 12. In some such embodiments, a level of thermal expansion of the fluid within the closed cavity or associated components of the block manifold may be estimated based at least in part on the temperature detected by the one or more temperature sensors.

The overpressure discussed above may be generated based on heat present in a production stream of the header bore 14. For example, hot production oil or other high-temperature fluid may be received from one or more active branch connections 16. Heat transfer through the block manifold 12 raises the temperature of the fluid within the closed cavity of the capped-off branch connection, leading to thermal expansion. The thermal expansion of the fluid within the closed cavity produces an overpressure therein. Accordingly, embodiments of the present disclosure provide a means for countering or absorbing the overpressure within the closed cavity to thereby prevent sensitive components from being operated above the intended operation pressure ratings thereof.

Figure 2:
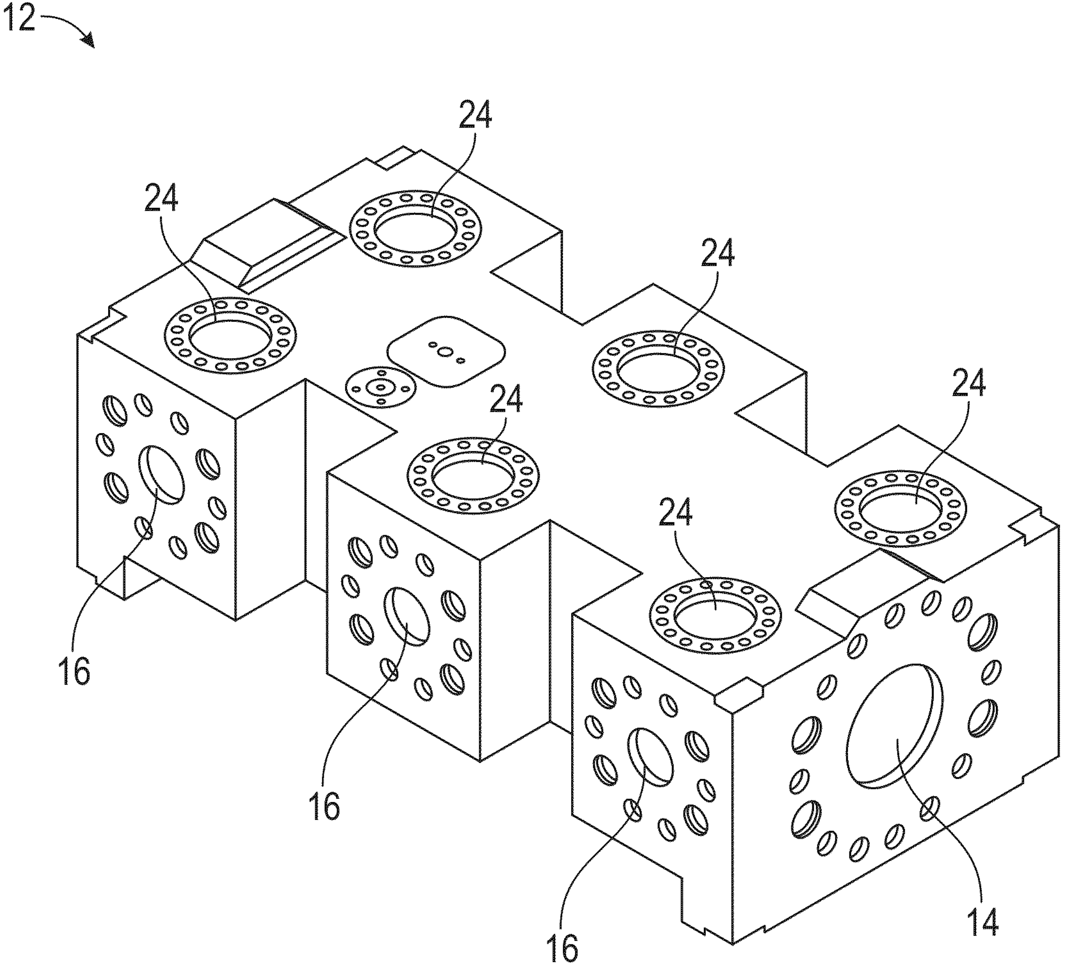
FIG. 2 illustrates an exemplary view of the block manifold in accordance with embodiments of the present disclosure.

FIG. 2 illustrates an exemplary view of the block manifold 12 relating to some embodiments of the present disclosure. In some embodiments, the block manifold 12 may be machined from a metal material such as steel, stainless steel, aluminum, titanium, or another suitable rigid material. Further, any combination of additive or subtractive manufacturing methods are contemplated for providing the block manifold 12. Similar to as described above, the block manifold 12 includes the header bore 14 extending through a length of the block manifold 12, as shown. Further, the block manifold 12 includes a plurality of valve openings 24, including bored holes for receiving the respective plurality of valves 18.

In some embodiments, the block manifold 12 may be configured to interface with a plurality of fasteners for connecting tree components and valves. For example, a plurality of holes may be machined in the block manifold 12 to receive fasteners such as bolts or other suitable fasteners to connect other components to the block manifold 12. In some embodiments, the fastener holes may be disposed circumferentially around the bore of each valve opening 24 and branch connection 16.

In some embodiments, the block manifold 12 further includes one or more openings or compartments for receiving one or more sensors or control components. For example, a slot or cutaway portion may be included on a top surface of the block manifold 12 to receive a control device or sensor assembly.

Figure 3:
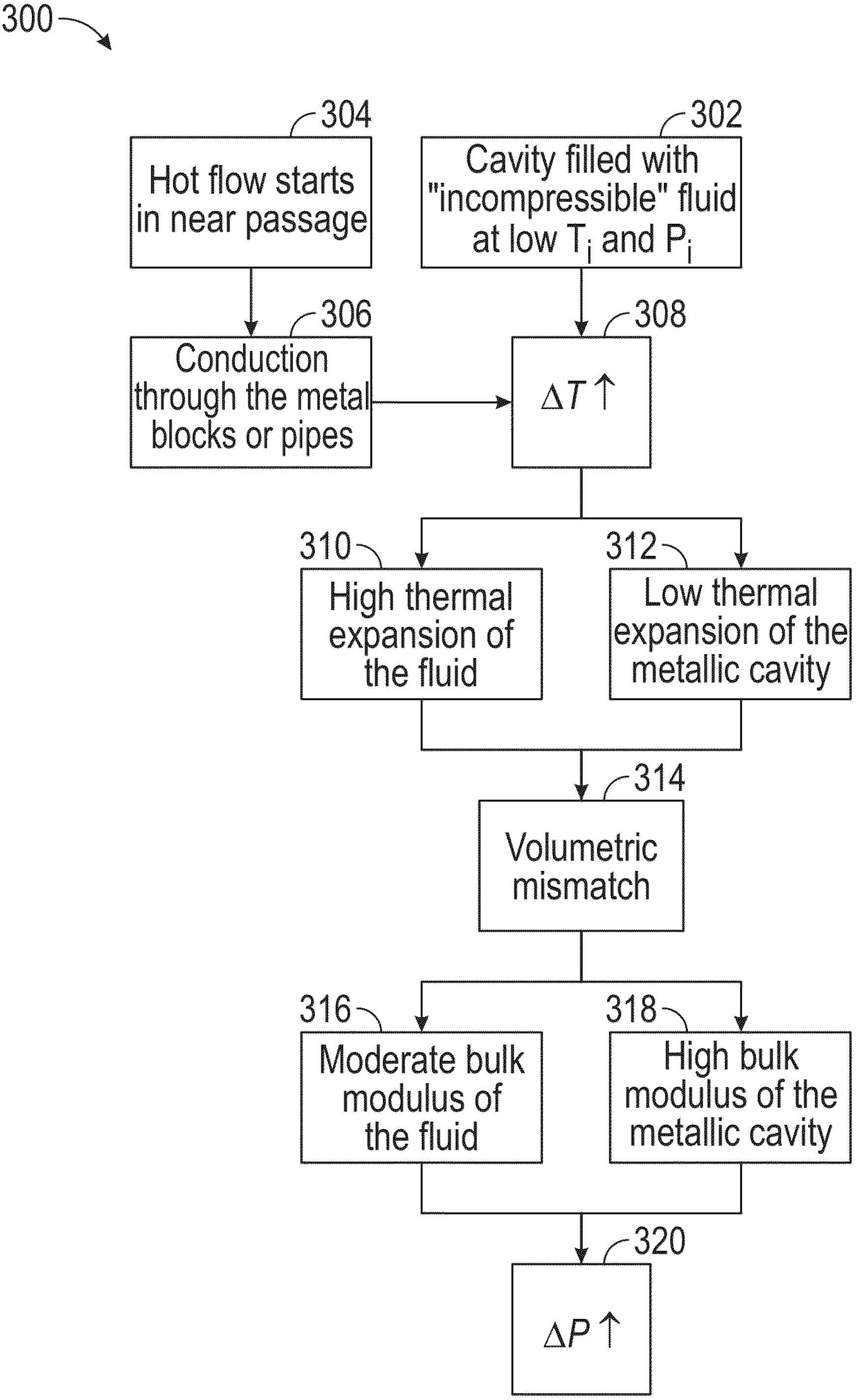
FIG. 3 illustrates an exemplary diagram highlighting an overpressure scenario in accordance with embodiments of the present disclosure.

FIG. 3 illustrates an exemplary diagram 300 highlighting an overpressure scenario relating to some embodiments of the present disclosure. At block 302, a cavity is filled with an incompressible fluid at a relatively low temperature and low pressure. The cavity may be a cavity associated with the closed branch connection, as described above.

At block 304, the hot flow starts in a near passage of the manifold. For example, one or more active lines may receive process fluid at a higher temperature compared to the incompressible fluid within the closed cavity. In some embodiments, hot flow, as described herein, refers to fluid flow with a temperature above a predetermined temperature threshold. Similarly, in some embodiments, high-temperature, as described herein, refers to a temperature above the predetermined temperature threshold. For example, in some embodiments, hot flow and high-temperature refer to a fluid temperature above 70 degrees Celsius. However, it should be understood that in some embodiments other predetermined temperature thresholds are contemplated, such as for example, fluid temperatures above 50 degrees Celsius, or above 100 degrees Celsius, as well as other specific temperature threshold values not explicitly described herein. At block 306, thermal conduction through the blocks and/or pipes of the manifold allows heat to travel into the closed cavity.

As a result of the thermal conduction, the temperature of the incompressible fluid within the closed cavity increases at block 308. At block 310, high thermal expansion occurs within the incompressible fluid. For example, the thermal expansion of the fluid may be approximately $5.10^{-4}$ per unit Kelvin. In some embodiments, high thermal expansion refers to thermal expansions above $4.00^{-4}$ per unit Kelvin or above $5.00^{-4}$ per unit Kelvin. Meanwhile, at block 312, low thermal expansion occurs for the closed cavity. Specifically, the closed cavity may be formed from a rigid material such as a metallic material. For example, the thermal expansion of the metallic cavity may be approximately $3.10^{-5}$ per unit Kelvin. In some embodiments, low thermal expansion refers to thermal expansions below $4.00^{-4}$ per unit Kelvin or below $3.50^{-4}$ per unit Kelvin. Accordingly, a volumetric mismatch between the closed cavity and the fluid disposed therein occurs at block 314 as a result of the disparate thermal expansion between the cavity and the fluid disposed therein.

The bulk modulus of a substance relates to the incompressibility of the substance. Specifically, the bulk modulus refers to the substance's ability to withstand changes in volume under compression. The fluid within the cavity has a moderate bulk modulus, as can be seen at block 316. For example, the fluid may have a bulk modulus within a range from 1 to 5 GPa, approximately. In some embodiments, a moderate bulk modulus is within a range from 1 to 50 GPa. The closed cavity has a relatively higher bulk modulus, as can be seen at block 318. For example, the cavity may have a bulk modulus of approximately 160 GPa. In some embodiments, a high bulk modulus refers to a bulk modulus of 100 GPa or greater. At block 320, a pressure increase occurs as a result of the volumetric mismatch (block 314) and the difference in bulk modulus (blocks 316, 318).

Figure 4:
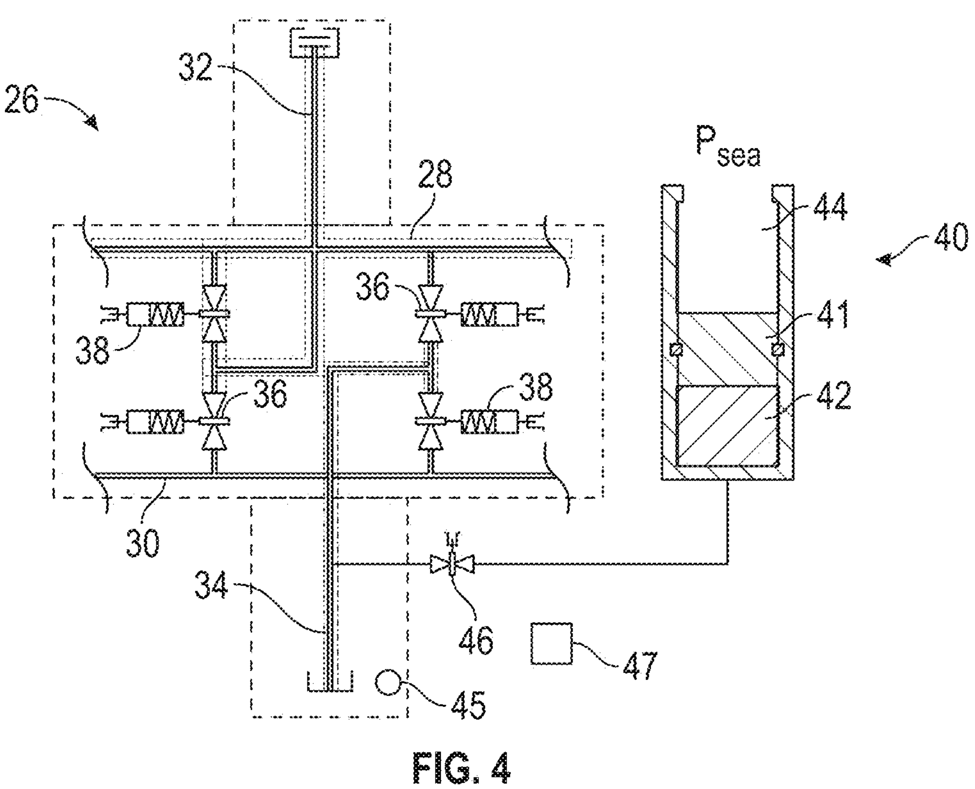
FIG. 4 illustrates an exemplary overpressure compensation assembly for a manifold system in accordance with embodiments of the present disclosure.

FIG. 4 illustrates an exemplary overpressure compensation assembly for a manifold system 26 relating to some embodiments of the present disclosure. In some embodiments, the manifold system 26 is a dual header valve system including a first header bore 28 and a second header bore 30. Alternatively, or additionally, embodiments are contemplated in which any suitable number of headers and header bores are included. For example, in some embodiments, the manifold system 26 includes a single header bore.

One or more branch connections may be included that are connected to either the first header bore 28 or the second header bore 30. For example, the manifold system 26 may include an active branch connection 32 and an inactive branch connection 34. The active branch connection 32 may be actively used to transport a production fluid to the header bore 28. Conversely, the inactive branch connection 34 may be closed via one or more valves 36 of the manifold system 26 and/or a cap disposed at an opposite end of the branch connection. Additionally, in some embodiments, the manifold system 26 includes one or more pumps 38, which may be coupled to each respective valve 36. The valves 36 may include bidirectional gate valves configured to seal on each side to thereby prevent fluid from traveling in either direction (i.e., from the branch connection to the header bore, or vice versa). For example, in some embodiments, a valve 36 may be included at each connection of the inactive branch connection 34 to the header bores 28 and 30, as shown. Accordingly, the cavity within the inactive branch connection 34 may be closed by closing both a first valve 36 at the connection to the first header bore 28 and a second valve 36 at the connection to the second header bore 30. When both valves 36 are closed, a volume of fluid is trapped within the closed cavity of the inactive branch connection 34.

As described above, the manifold system 26 may experience overpressure from thermal expansion of fluid within the inactive branch connection 34 as the production fluid within the active branch connection 32 heats the closed cavity of the closed inactive branch connection 34. Accordingly, an expanding volume pressure compensation assembly 40 is coupled to the manifold system 26 to compensate and/or mitigate the overpressure. For example, the expanding volume pressure compensation assembly 40 may be coupled to the inactive branch connection 34 to compensate for the overpressure generated by the thermal expansion.

In some embodiments, the expanding volume pressure compensation assembly 40 includes a piston 41 disposed between a trapped fluid portion 42 that is fluidly connected to the closed cavity of the inactive branch connection 34 and an open portion 44 that is open to the environment, for example, the sea within a subsea manifold system. Accordingly, the piston 41 of the expanding volume pressure compensation assembly 40 allows the fluid within the closed cavity to expand freely. In some embodiments, a piston assembly is included including any combination of a main body, a stem, a gasket, a flange, a snap ring, an O-ring, a seal retainer, a stem packing, a packing spacer, as well as pluralities thereof. In some embodiments, the piston assembly further includes any of a rubber bumper to reduce wear, a filter to remove waste from the fluid, and a position indicator configured to convey a current position of the piston 41.

In some embodiments, a valve 46 may be included for selectively connecting and disconnecting the expanding volume pressure compensation assembly 40 from the inactive branch connection 34. For example, the inactive branch connection 34 may be disconnected and reopened to continue production. Accordingly, the valve 46 may be closed to disconnect the fluid path to the expanding volume pressure compensation assembly 40 or other pressure compensation assembly connected thereto.

In some embodiments, the valve 46 is controlled automatically based at least in part on a pressure or temperature within the closed cavity. For example, a pressure sensor 45 may be disposed within the closed cavity, and a control unit 47 may be programmed to open the valve 46 responsive to sensing a pressure above a predetermined pressure threshold.

Figure 5:
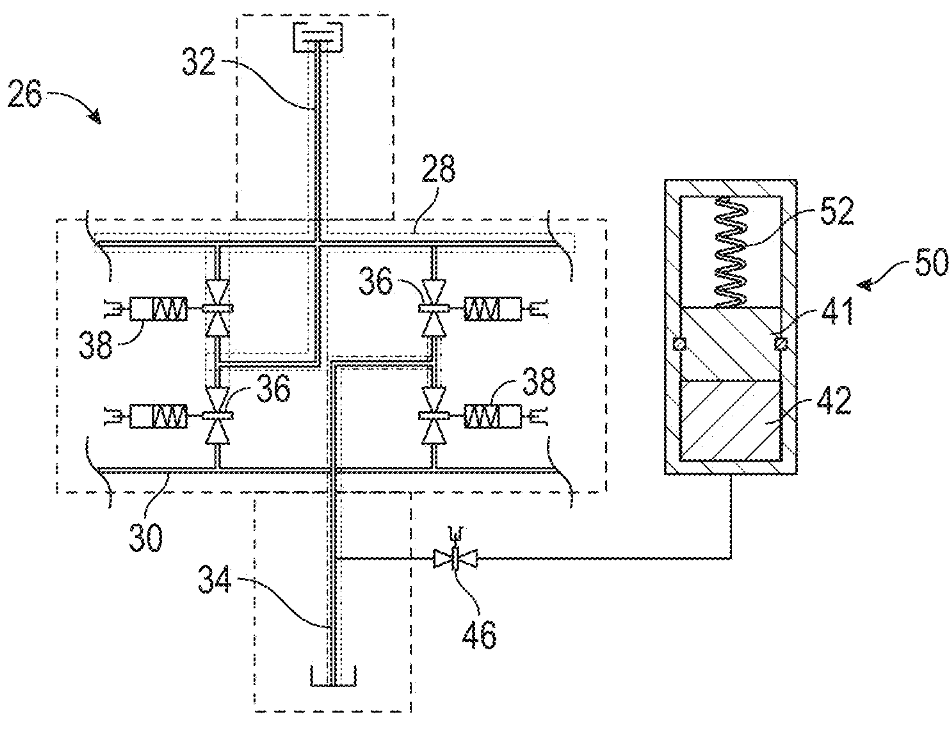
FIG. 5 illustrates an exemplary spring-loaded overpressure compensation assembly for the manifold system in accordance with embodiments of the present disclosure.

FIG. 5 illustrates an exemplary spring-loaded overpressure compensation assembly 50 for the manifold system 26 relating to some embodiments of the present disclosure. The manifold system 26 may include any combination of the first header bore 28, the second header bore 30, the active branch connection 32, the inactive branch connection 34, the one or more valves 36, and the one or more pumps 38, as described above, as well as one or more other components not explicitly described herein.

The spring-loaded overpressure compensation assembly 50 includes a piston 41 with the trapped fluid portion 42 fluidly connected to the branch connection 34 while the valve 46 is open. Additionally, the exemplary spring-loaded overpressure compensation assembly 50 may include a compensation spring 52 configured to counteract the overpressure within the closed cavity. For example, the compensation spring 52 may be disposed at the piston 41 on a side opposite the trapped fluid portion 42 such that the compensation spring 52 pushes against the piston 41 toward the trapped fluid portion 42.

In some embodiments, the spring 52 may be selected based at least in part on a spring constant of the spring 52. For example, the spring 52 may be selected such that the force transferred to the spring (via pressure from the closed cavity) is within the total deflection length of the spring. Accordingly, the force rating and deflection rating for the spring is not exceeded. In some embodiments, the spring 52 is configured to be compressed when a pressure within the closed cavity is above a predetermined pressure threshold. As such, the pressure within the closed cavity may be relieved by compression of the spring 52.

Figure 6:
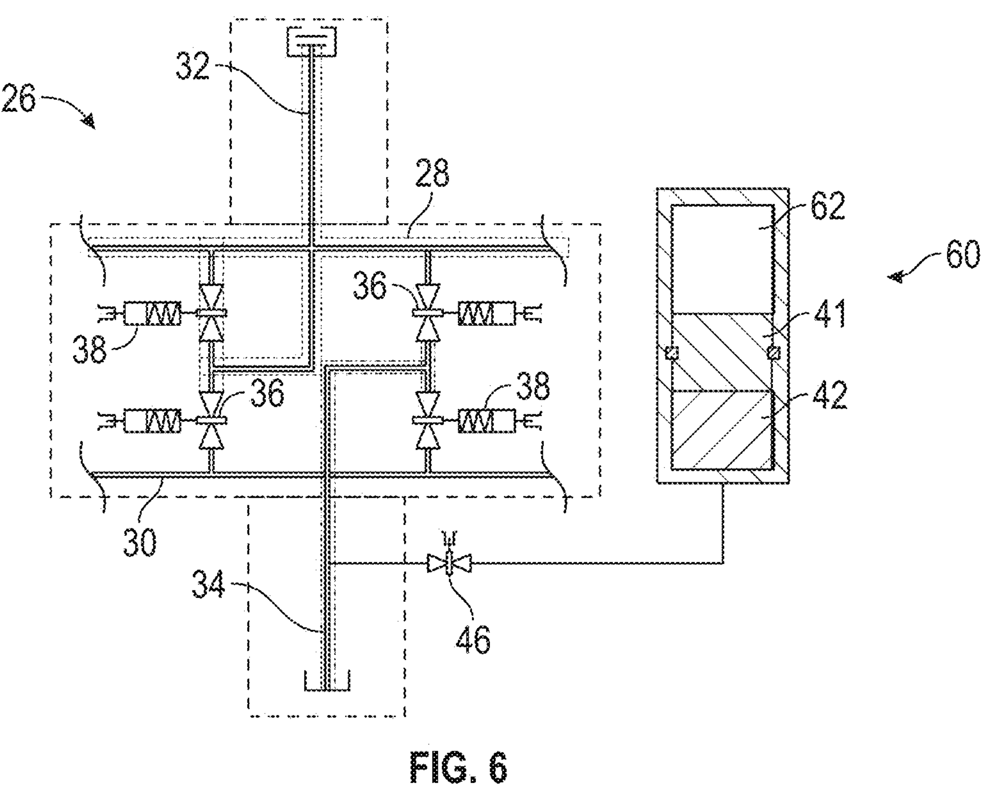
FIG. 6 illustrates an exemplary gas piston overpressure compensation assembly for the manifold system in accordance with embodiments of the present disclosure.

FIG. 6 illustrates an exemplary gas piston overpressure compensation assembly 60 for the manifold system 26 relating to some embodiments of the present disclosure. The manifold system 26 may include any combination of the first header bore 28, the second header bore 30, the active branch connection 32, the inactive branch connection 34, the one or more valves 36, and the one or more pumps 38, as described above, as well as one or more other components not explicitly described herein.

The gas piston overpressure compensation assembly 60 includes the trapped fluid portion 42 fluidly connected to the branch connection 34 while the valve 46 is open. In some embodiments, the gas piston overpressure compensation assembly 60 further includes a compressed gas portion 62, including a compressed gas such as, for example, pressurized nitrogen.

Figure 7:
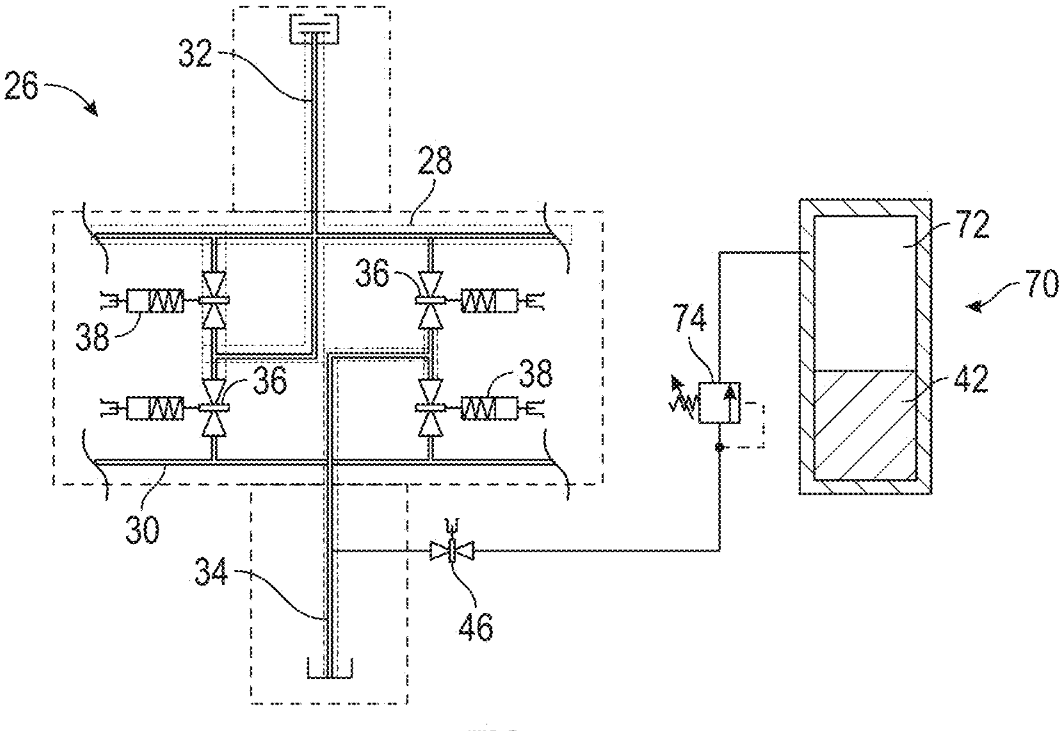
FIG. 7 illustrates an exemplary rejecting volume overpressure compensation assembly for the manifold system in accordance with embodiments of the present disclosure.

FIG. 7 illustrates an exemplary rejecting volume overpressure compensation assembly 70 for the manifold system 26 relating to some embodiments of the present disclosure. The manifold system 26 may include any combination of the first header bore 28, the second header bore 30, the active branch connection 32, the inactive branch connection 34, the one or more valves 36, and the one or more pumps 38, as described above, as well as one or more other components not explicitly described herein.

The rejecting volume overpressure compensation assembly 70 includes the trapped fluid portion 42 fluidly connected to the branch connection 34 while the valve 46 is open. In some embodiments, the rejecting volume overpressure compensation assembly 70 further includes an air portion 72 disposed within a second side of the piston. Additionally, the rejecting volume overpressure compensation assembly 70 may include a relief valve 74 disposed within the fluid path between the branch connection 34 and the rejecting volume overpressure compensation assembly 70. The relief valve 74 may include any suitable form of relief valve, such as, for example, a spring-loaded relief valve or a pilot-operated relief valve controlled by an auxiliary pressure pilot. Embodiments are contemplated in which other forms of pressure relief devices are included, such as, for example, a rupture disk. Further, in some embodiments, a plurality of relief valves may be included to provide redundancy or pressure relief in multiple distinct fluid paths of the overpressure compensation assembly. In some embodiments, the relief valve 74 has a cracking pressure below a limit of one or more components associated with the closed cavity. Accordingly, the relief valve 74 prevents the pressure from exceeding the rated pressure limit of the one or more components.

Figure 8A:
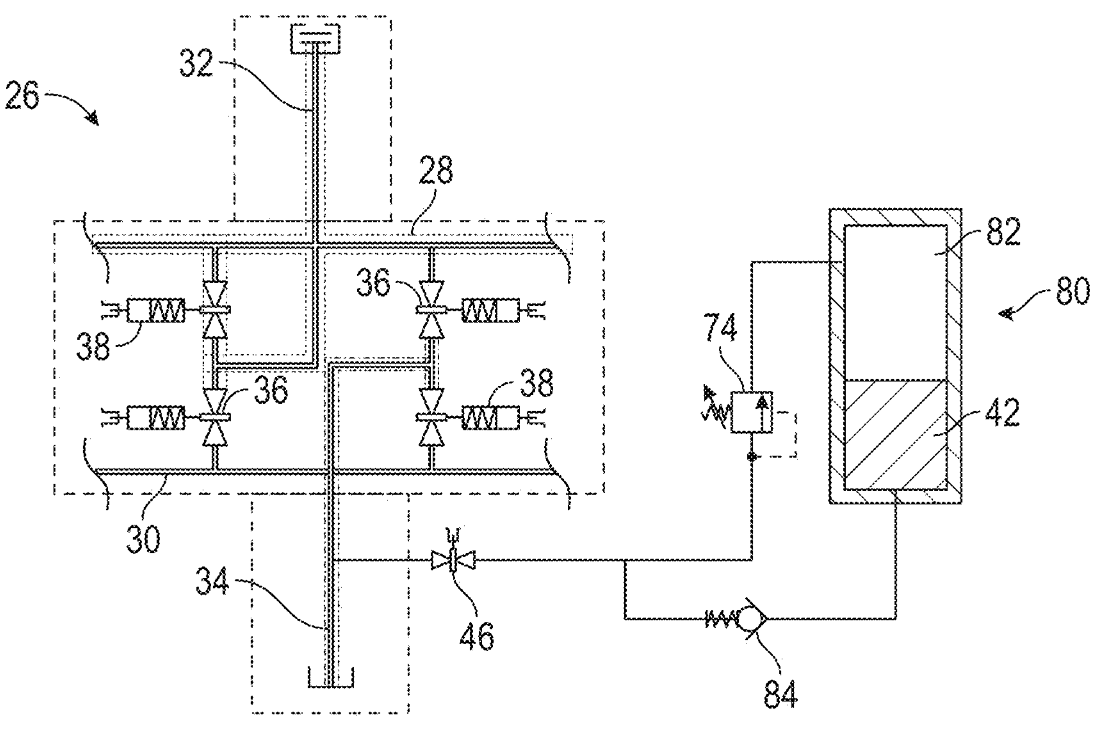
FIGS. 8A and 8B illustrate an exemplary rejecting volume overpressure compensation assembly with a return portion in accordance with embodiments of the present disclosure.
Figure 8B:
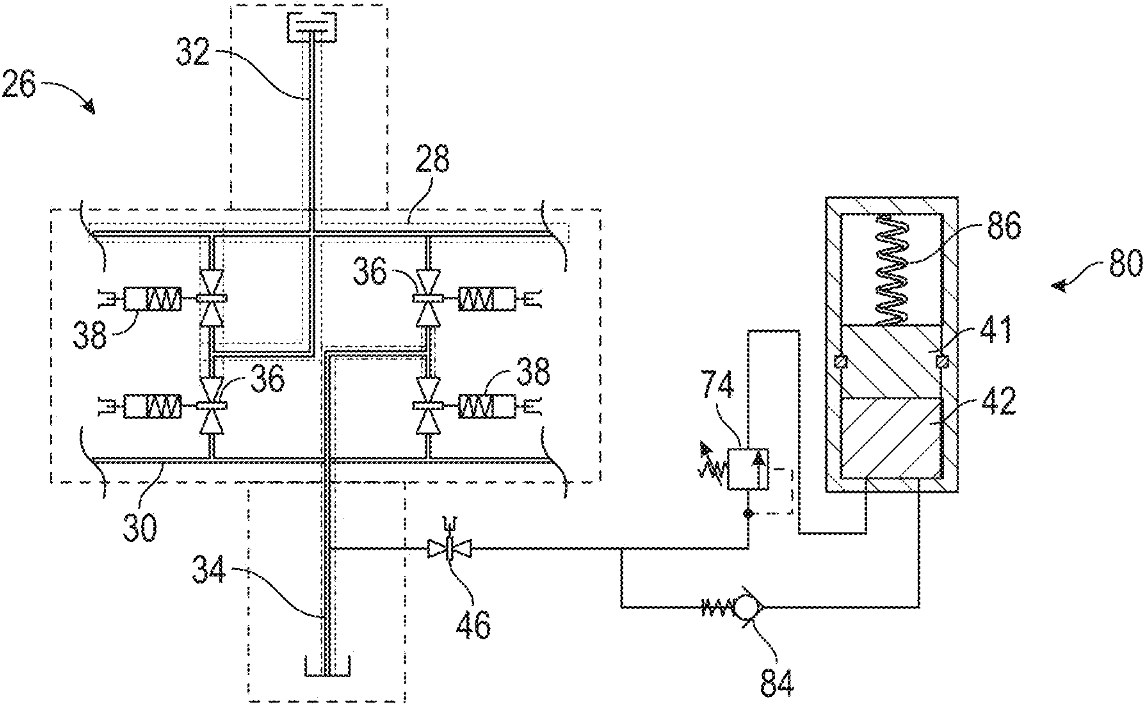

FIGS. 8A and 8B illustrate an exemplary rejecting volume overpressure compensation assembly 80 with a return portion relating to some embodiments of the present disclosure. The rejecting volume overpressure compensation assembly 80 may include an air portion 82, as shown in FIG. 8A, including an air-filled cavity that provides resistance to the trapped fluid portion 42.

In some embodiments, the rejecting volume overpressure compensation assembly 80 further includes a check valve 84 disposed in the fluid path between the inactive branch connection 34 and the rejecting volume overpressure compensation assembly 80. The check valve 84 may include a one-way valve configured to prevent flow in one direction and to allow flow in another direction. For example, the check valve 84 may be positioned such that fluid is able to flow from the closed cavity to the rejecting volume overpressure compensation assembly 80 but is prevented from flowing in the opposite direction.

In some embodiments, the check valve 84 includes any suitable form of check valve or one-way valve, such as, for example, a swing check valve, a butterfly check valve, a disc check valve, a stop check valve, a diaphragm check valve, a duckbill check valve, a pneumatic check valve, a needle check valve, or a piston check valve. In some embodiments, the type of check valve may be selected based at least in part on an intended flow or internal diameter of the flow path. Further, in some embodiments, a plurality of check valves are included.

The rejecting volume overpressure compensation assembly 80 may be configured with a return portion including another fluid path to the closed cavity to thereby allow the return of fluid to the closed cavity to prevent the piston assembly from becoming overfilled.

In some embodiments, the rejecting volume overpressure compensation assembly 80 includes a spring 86. The spring 86 may be configured similarly to the compensation spring 52, such that the spring 86 provides resistance to the trapped fluid portion 42. For example, the piston 41 may be configured to compress the spring 86 based on a pressure within the closed cavity of the inactive branch connection 34.

Figure 9A:
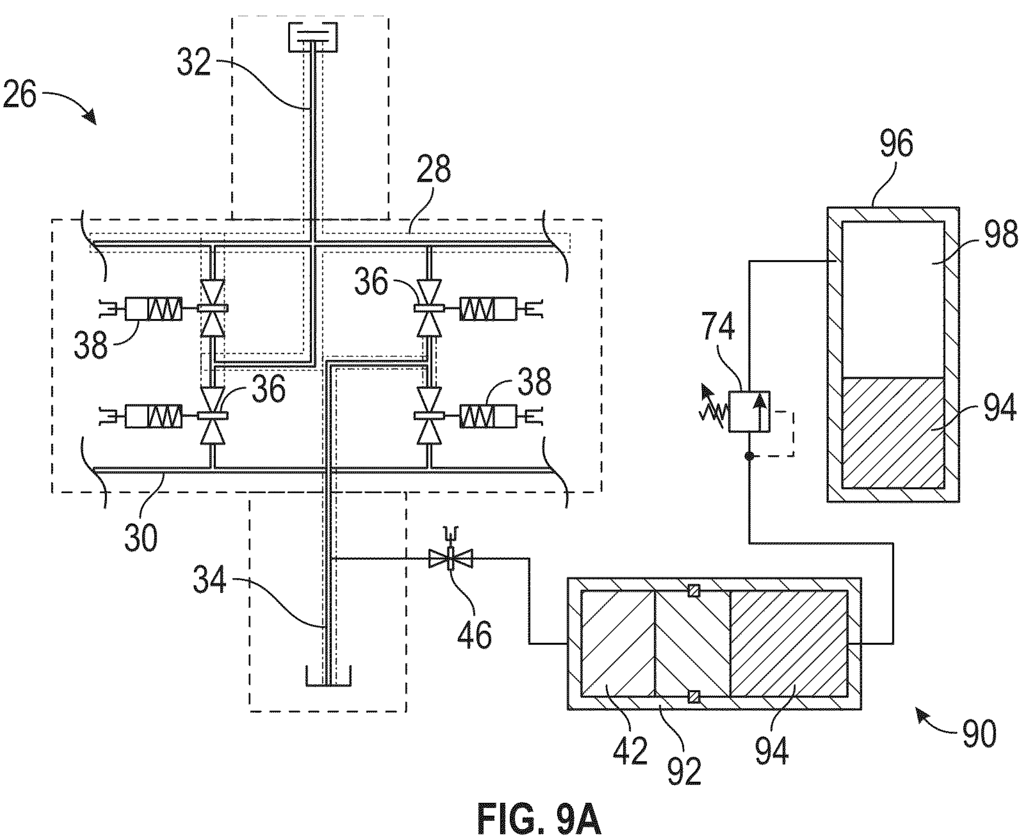
FIGS. 9A and 9B illustrate an exemplary rejecting volume overpressure compensation assembly with a barrier fluid in accordance with embodiments of the present disclosure.
Figure 9B:
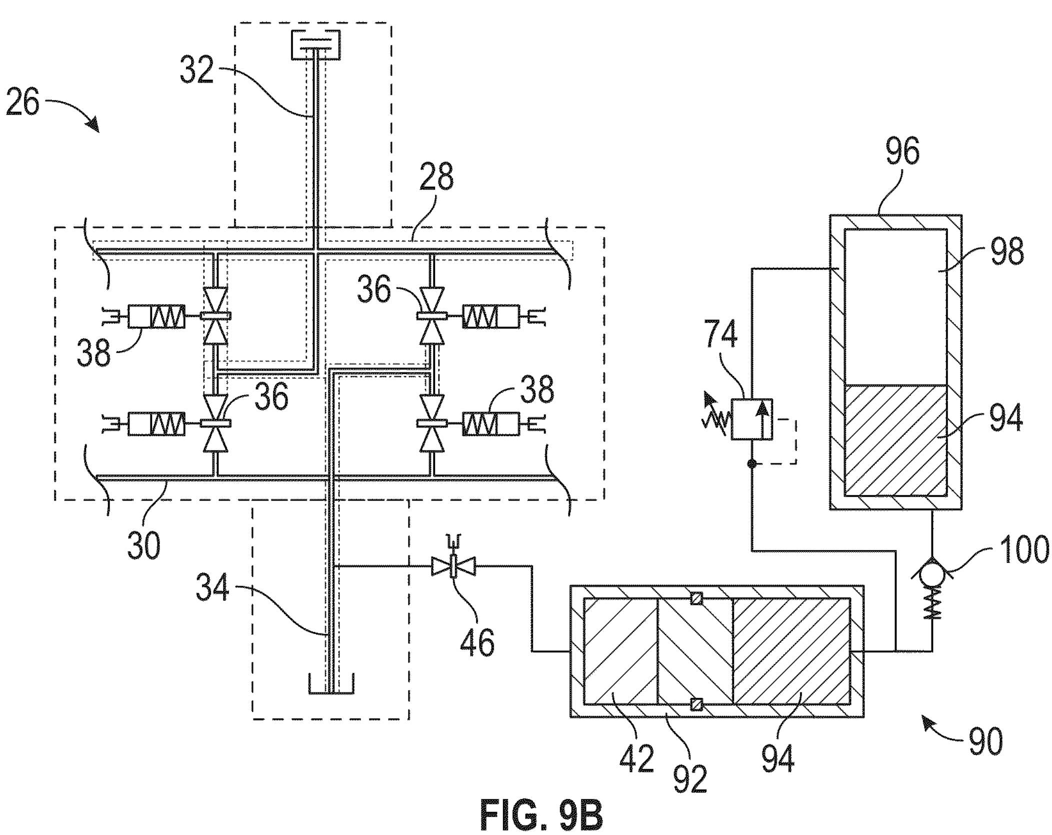

FIGS. 9A and 9B illustrate an exemplary rejecting volume overpressure compensation assembly 90 with a barrier fluid relating to some embodiments of the present disclosure. In some embodiments, the barrier fluid may be configured to prevent the mixing of the fluid within the closed cavity and one or more other fluids such that the fluid within the closed cavity is not polluted or contaminated.

The rejecting volume overpressure compensation assembly 90 includes a first piston 92. The first piston 92 is disposed between the trapped fluid portion 42 and a barrier fluid portion 94, including a barrier fluid disposed therein. The barrier fluid may include a separate fluid distinct from the production fluid that is configured to separate the production fluid from at least a portion of the rejecting volume overpressure compensation assembly 90. In some embodiments, the barrier fluid is a benign fluid configured to increase a lifetime of one or more sensitive components of the rejecting volume overpressure compensation assembly 90. Examples of a suitable barrier fluid include any form of non-acidic, moderate pH, benign fluid such as an organic or synthetic inorganic fluid.

The barrier fluid portion 94 of the first piston 92 may be fluidly connected to a second piston 96. In some embodiments, the relief valve 74 is disposed in the fluid path between the first piston 92 and the second piston 96, as shown. The second piston 96 further includes an air portion 98 disposed opposite the barrier fluid portion 94. Accordingly, when the pressure increases within the trapped fluid portion 42, the first piston 92 compresses the barrier fluid in the barrier fluid portion 94, compressing the air in the air portion 98 of the second piston 96. In some embodiments, the barrier fluid is configured to prevent the mixing of the fluid within the closed cavity and the pressurized fluid, such as pressurized air within the air portion 98. Accordingly, for example, where the fluid in the closed cavity includes a production fluid, the production fluid is prevented from being contaminated with the pressurized air (or other contaminants) by the inclusion of the barrier fluid.

In some embodiments, a check valve 100 is disposed in a second fluid path connection between the first piston 92 and the second piston 96, as shown in FIG. 9B. The check valve 100 may be configured to prevent backflow of the barrier fluid from the second piston 96 to the first piston 92. Alternatively, or additionally, embodiments are contemplated in which the check valve 100 is disposed in-line in the same fluid path as the relief valve 74.

In some embodiments, the barrier fluid and combination of the first piston 92 and the second piston 96 increase a reliability of the rejecting volume overpressure compensation assembly 90 compared to systems with a single piston assembly. Further, in some embodiments, the barrier fluid may increase a reliability of the relief valve 74 and the check valve 100. For example, the barrier fluid may include a non-acidic, moderate pH, benign fluid such as an organic or synthetic inorganic fluid, as described above, that does not damage the valves of the rejecting volume overpressure compensation assembly 90. Accordingly, the lives of the relief valve 74 and the check valve 100 are increased by using multiple distinct fluids such that only the barrier fluid is permitted to flow through the valves.

In some embodiments, any portion of the components described above with respect to the expanding volume pressure compensation assembly 40, the exemplary spring-loaded overpressure compensation assembly 50, the gas piston overpressure compensation assembly 60, the rejecting volume overpressure compensation assembly 70, the rejecting volume overpressure compensation assembly 80, and the rejecting volume overpressure compensation assembly 90 may be configured to operate passively. For example, a valve may be configured passively with a cracking pressure such that the valve opens based on a predetermined pressure threshold.

Additionally, or in the alternative, components may be operated actively. For example, a controller may be included that includes at least one processor to execute computer-executable instructions from a non-transitory computer-readable media or plurality thereof. Accordingly, in some embodiments, the valve 46 may be opened and closed responsive to one or more sensed parameters or responsive to another operation. For example, the valve 46 may be opened responsive to a corresponding valve 36 being closed. Accordingly, the overpressure compensation assembly is connected whenever the cavity is closed to reduce a significant pressure increase within the closed cavity.

The embodiments described above are directed to subsea manifold systems. However, it should be understood that the systems and devices herein may be used in other forms of manifold systems, such as, terrestrial or subterranean manifold systems. For example, any of the expanding volume pressure compensation assembly 40, the exemplary spring-loaded overpressure compensation assembly 50, the gas piston overpressure compensation assembly 60, the rejecting volume overpressure compensation assembly 70, the rejecting volume overpressure compensation assembly 80, or the rejecting volume overpressure compensation assembly 90 may be coupled to a terrestrial manifold system disposed above ground. Further, many of the embodiments shown and described above relate to dual header subsea block manifold systems. However, it should be understood that embodiments with single header block manifolds and other forms of manifolds are also contemplated.

Figure 10A:
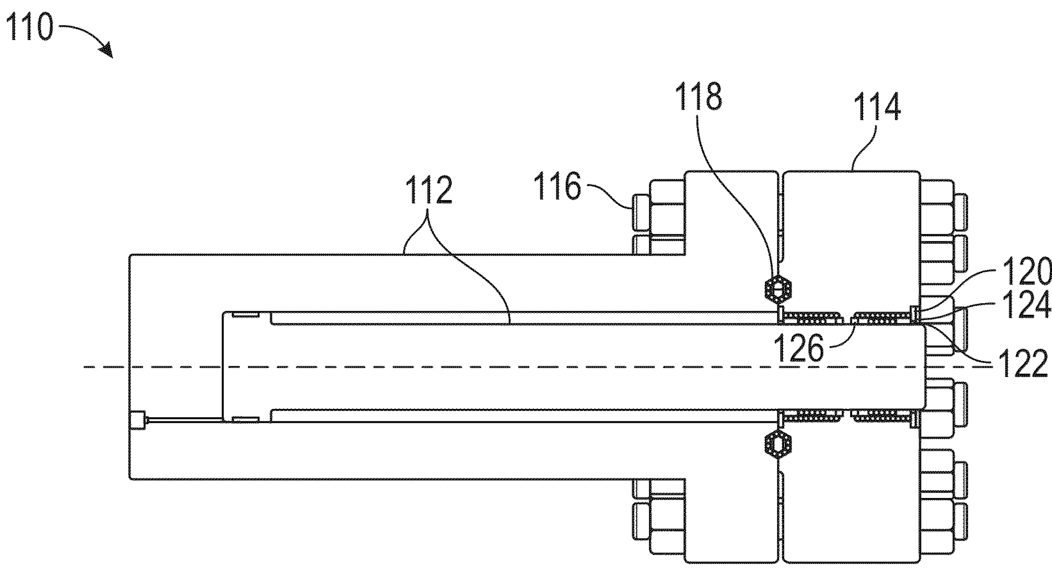
FIG. 10A illustrates an exemplary piston assembly in accordance with embodiments of the present disclosure.

FIG. 10A illustrates an exemplary piston assembly 110 in accordance with embodiments of the present disclosure. The piston assembly 110 may be included within any of the overpressure compensation systems described above, such as, for example, the expanding volume pressure compensation assembly 40, the spring-loaded overpressure compensation assembly 50, the gas piston overpressure compensation assembly 60, the rejecting volume overpressure compensation assembly 70, the rejecting volume overpressure compensation assembly 80, and the rejecting volume overpressure compensation assembly 90.

The piston assembly 110 includes a main body stem 112 secured to a flange 114, for example, using a plurality of nuts 116 or other suitable fasteners. For example, the plurality of nuts 116 may be disposed radially about a center of the main body stem 112. Further, in some embodiments, a gasket 118 is included between the main body stem 112 and the flange 114 to provide sealing and wear protection. In some embodiments, the piston assembly 110 includes a piston housing. Further, in some embodiments, the main body stem 112 and the flange 114 may be included as part of the piston housing. In some embodiments, a snap ring 120 is included at an end of the main body stem 112, as shown. In some embodiments, the piston assembly 110 further includes any combination of a seat retainer 122, a stem packing 124, and a packing spacer 126.

Figure 10B:
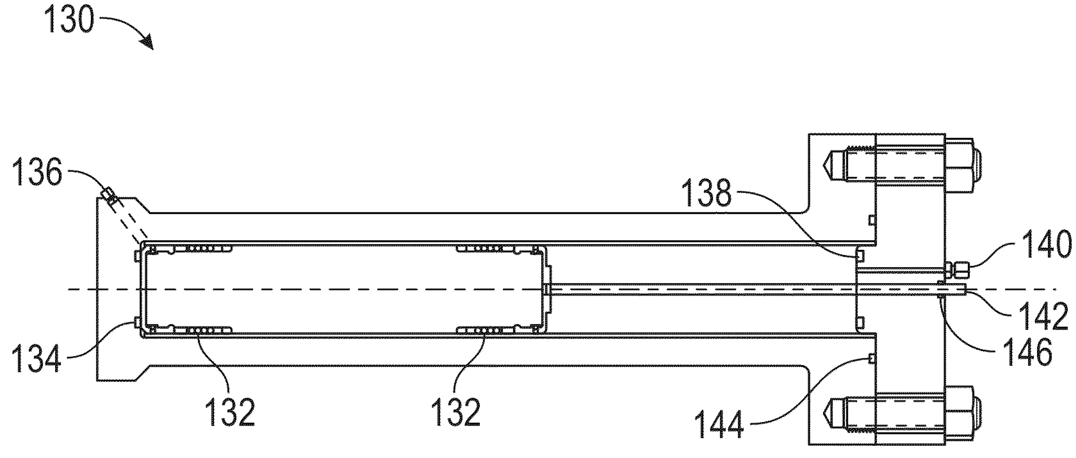
FIG. 10B illustrates an exemplary piston assembly in accordance with embodiments of the present disclosure.

FIG. 10B illustrates an exemplary piston assembly 130 relating to some embodiments of the present disclosure. In some embodiments, the piston assembly 130 includes any combination of the components described above with respect to the piston assembly 110, such as, for example, the main body stem 112, the flange 114, the plurality of nuts 116, the gasket 118, the snap ring 120, the seat retainer 122, the stem packing 124, and the packing spacer 126.

The exemplary piston assembly 130 further includes one or more stem packings 132 disposed at each end of the piston, a first pair of rubber bumpers 134 disposed at a first end of the piston assembly 130, a connection port 136 configured to be fluidly connected to the closed cavity, and a second pair of rubber bumpers 138 disposed at a second end of the piston assembly 130. In some embodiments, the piston assembly 130 further includes any of a connection post 140 configured to be connected to a filter of the piston assembly 130, a position indicator 142, a first O-ring 144 disposed on a portion of a main body stem of the piston assembly 130, and a second O-ring 146 disposed on an end of a flange of the piston assembly 130. The position indicator 142 may be configured to extend out of an end of the piston assembly 130, as shown, to thereby indicate a position of the piston within an internal portion of the piston assembly 130.

In some embodiments, any number of O-rings may be included to provide a seal within the piston assembly. Further, in some embodiments, any combination of additional components may be included within either the piston assembly 110 or the piston assembly 130, such as, for example, additional valves, fluid connection ports, pressure sensors, temperature sensors, controllers, and other suitable components.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising: a piston assembly comprising: a piston; a first end coupled to the closed cavity of the subsea manifold to compensate a pressure within the closed cavity; and a second end disposed opposite the first end, the second end configured to allow expansion of fluid within the closed cavity. Thus, the illustrative embodiment provides technological improvements over conventional techniques by implementing an overpressure compensation assembly that provides more efficient mechanisms for relieving the pressure within the cavity of a manifold.

Clause 2. The overpressure compensation assembly of clause 1, wherein the second end is open to an environment of the piston assembly to thereby allow free expansion of the fluid within the closed cavity.

Clause 3. The overpressure compensation assembly of clause 1 or clause 2, further comprising: a valve disposed in a fluid path between the closed cavity and the first end of the piston assembly, the valve configured to selectively connect and disconnect the piston assembly from the subsea manifold.

Clause 4. The overpressure compensation assembly of any of clause 1 through clause 3, wherein the second end is coupled to a spring.

Clause 5. The overpressure compensation assembly of any of clause 1 through clause 4, wherein the piston assembly further comprises: a main body stem; and a flange secured to the main body stem via a plurality of nuts disposed radially about a center of the main body stem.

Clause 6. The overpressure compensation assembly of any of clause 1 through clause 5, wherein the piston assembly further comprises: a gasket; and one or more O-rings configured to provide a seal.

Clause 7. The overpressure compensation assembly of any of clause 1 through clause 6, wherein the piston assembly further comprises: a position indicator extending from an end of the piston assembly configured to indicate a position of the piston.

Clause 8. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising: a piston assembly comprising: a piston; a first end coupled to the closed cavity of the subsea manifold to compensate a pressure within the closed cavity; and a second end coupled to a spring. Thus, the illustrative embodiment provides technological improvements over conventional techniques by implementing an overpressure compensation assembly that provides more efficient mechanisms for relieving the pressure within the cavity of a manifold.

Clause 9. The overpressure compensation assembly of clause 8, further comprising: a relief valve disposed in at least one fluid path between the closed cavity and the first end of the piston assembly.

Clause 10. The overpressure compensation assembly of clause 8 or clause 9, further comprising: a check valve disposed in the at least one fluid path between the closed cavity and the first end of the piston assembly.

Clause 11. The overpressure compensation assembly of any of clause 8 through clause 10, further comprising: a control valve disposed in the at least one fluid path between the closed cavity and the first end of the piston assembly, the control valve configured to selectively connect and disconnect the piston assembly from the subsea manifold.

Clause 12. The overpressure compensation assembly of any of clause 8 through clause 11, wherein the spring is selected based at least in part on a spring constant of the spring.

Clause 13. The overpressure compensation assembly of any of clause 8 through clause 12, wherein a first end of the spring is secured to the piston and a second end of the spring is secured to a portion of a piston housing of the piston assembly.

Clause 14. The overpressure compensation assembly of any of clause 8 through clause 13, wherein the spring is configured to be compressed when a pressure within the closed cavity is above a predetermined pressure threshold.

Clause 15. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising: a first piston assembly comprising: a piston; a first end coupled to the closed cavity of the subsea manifold to compensate a pressure within the closed cavity; and a second end comprising a barrier fluid disposed therein, the barrier fluid distinct from the fluid within the closed cavity. Thus, the illustrative embodiment provides technological improvements over conventional techniques by implementing an overpressure compensation assembly that provides more efficient mechanisms for relieving the pressure within the cavity of a manifold.

Clause 16. The overpressure compensation assembly of clause 15, further comprising: a relief valve disposed in a fluid path between the closed cavity and the piston, the relief valve configured with a cracking pressure below a limit of one or more components associated with the closed cavity.

Clause 17. The overpressure compensation assembly of clause 15 or clause 16, further comprising: a second piston assembly comprising: a piston; a first end fluidly connected to the second end of the first piston assembly; a second end fluidly comprising a pressurized fluid distinct from the barrier fluid.

Clause 18. The overpressure compensation assembly of any of clause 15 through clause 17, further comprising: a relief valve disposed in a first fluid path between the first piston assembly and the second piston assembly.

Clause 19. The overpressure compensation assembly of any of clause 15 through clause 18, further comprising: a check valve disposed in a second fluid path between the first piston assembly and the second piston assembly.

Clause 20. The overpressure compensation assembly of any of clause 15 through clause 19, wherein the barrier fluid prevents mixing of the fluid within the closed cavity and the pressurized fluid.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising:

a piston assembly comprising:

a piston having a first end and a second end opposite the first end;

a first portion disposed proximate the first end of the piston, the first portion fluidly coupled to the closed cavity of the subsea manifold to compensate a pressure within the closed cavity of the subsea manifold, the pressure associated with the thermal expansion of the fluid within the closed cavity; and a second portion disposed proximate the second end of the piston, the second portion configured to allow expansion of fluid within the closed cavity of the subsea manifold through actuation of the piston; and a valve disposed in a fluid path between the closed cavity of the subsea manifold and the first portion, the valve configured to selectively connect and disconnect the piston assembly from the subsea manifold, wherein the valve is controlled automatically based at least in part on a pressure within the closed cavity of the subsea manifold.

2. The overpressure compensation assembly of claim 1, wherein the second end is open to an environment of the piston assembly to thereby allow free expansion of the fluid within the closed cavity.

3. The overpressure compensation assembly of claim 1, wherein the second end is coupled to a spring.

4. The overpressure compensation assembly of claim 1, wherein the piston assembly further comprises:

a main body stem; and a flange secured to the main body stem via a plurality of nuts disposed radially about a center of the main body stem.

5. The overpressure compensation assembly of claim 4, wherein the piston assembly further comprises:

a gasket; and one or more O-rings configured to provide a seal.

6. The overpressure compensation assembly of claim 5, wherein the piston assembly further comprises:

a position indicator extending from an end of the piston assembly configured to indicate a position of the piston.

7. The overpressure compensation assembly of claim 1, further comprising:

a pressure sensor disposed within the closed cavity; and a control unit coupled to the valve.

8. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising:

a piston assembly comprising:

a piston having a first end and a second end opposite the first end;

a first portion disposed proximate the first end of the piston, the first portion fluidly coupled to the closed cavity of the subsea manifold to compensate a pressure within the closed cavity, the pressure associated with the thermal expansion of the fluid within the closed cavity of the subsea manifold; and a second portion disposed proximate the second end of the piston and coupled to a spring; and a valve disposed in a fluid path between the closed cavity of the subsea manifold and the first portion, the valve configured to selectively connect and disconnect the piston assembly from the subsea manifold, wherein the valve is controlled automatically based at least in part on a pressure within the closed cavity of the subsea manifold.

9. The overpressure compensation assembly of claim 8, further comprising:

a relief valve disposed in at least one fluid path between the closed cavity and the first end of the piston assembly.

10. The overpressure compensation assembly of claim 9, further comprising:

a check valve disposed in the at least one fluid path between the closed cavity and the first end of the piston assembly.

11. The overpressure compensation assembly of claim 8, wherein the spring is selected based at least in part on a spring constant of the spring.

12. The overpressure compensation assembly of claim 8, further comprising:

a pressure sensor disposed within the closed cavity; and a control unit coupled to the valve.

13. The overpressure compensation assembly of claim 8, wherein a first end of the spring is secured to the piston and a second end of the spring is secured to a portion of a piston housing of the piston assembly.

14. The overpressure compensation assembly of claim 13, wherein the spring is configured to be compressed when a pressure within the closed cavity is above a predetermined pressure threshold.

15. An overpressure compensation assembly for reducing an overpressure within a closed cavity of a subsea manifold, the overpressure generated by thermal expansion of a fluid within the closed cavity caused by high-temperature fluid within an active portion of the subsea manifold, the overpressure compensation assembly comprising:

a first piston assembly comprising:

a piston having a first end and a second end opposite the first end;

a first portion disposed proximate the first end of the piston, the first portion fluidly coupled to the closed cavity of the subsea manifold to compensate a pressure within the closed cavity of the subsea manifold, the pressure associated with the thermal expansion of the fluid within the closed cavity of the subsea manifold; and a second portion disposed proximate the second end of the piston, the second portion comprising a barrier fluid disposed therein, the barrier fluid distinct from the fluid within the closed cavity of the subsea manifold; and a valve disposed in a fluid path between the closed cavity of the subsea manifold and the first portion, the valve configured to selectively connect and disconnect the first piston assembly from the subsea manifold, wherein the valve is controlled automatically based at least in part on a pressure within the closed cavity of the subsea manifold.

16. The overpressure compensation assembly of claim 15, further comprising:

a relief valve disposed in a fluid path between the closed cavity and the piston, the relief valve configured with a cracking pressure below a limit of one or more components associated with the closed cavity.

17. The overpressure compensation assembly of claim 15, further comprising:

a second piston assembly comprising:

a piston;

a first end fluidly connected to the second end of the first piston assembly; and a second end fluidly comprising a pressurized fluid distinct from the barrier fluid.

18. The overpressure compensation assembly of claim 17, further comprising:

a relief valve disposed in a first fluid path between the first piston assembly and the second piston assembly.

19. The overpressure compensation assembly of claim 18, further comprising:

a check valve disposed in a second fluid path between the first piston assembly and the second piston assembly.

20. The overpressure compensation assembly of claim 19, wherein the barrier fluid prevents mixing of the fluid within the closed cavity and the pressurized fluid.

* * * * *